United States Patent
Xiao et al.

(10) Patent No.: US 12,287,719 B2
(45) Date of Patent: Apr. 29, 2025

(54) ACTIVITY RECOGNITION MODEL BALANCED BETWEEN VERSATILITY AND INDIVIDUATION AND SYSTEM THEREOF

(71) Applicant: HUAZHONG UNIVERSITY OF SCIENCE AND TECHNOLOGY, Wuhan (CN)

(72) Inventors: Jiang Xiao, Wuhan (CN); Huichuwu Li, Wuhan (CN); Minrui Wu, Wuhan (CN); Hai Jin, Wuhan (CN)

(73) Assignee: HUAZHONG UNIVERSITY OF SCIENCE AND TECHNOLOGY, Wuhan (CN)

( * ) Notice: Subject to any disclaimer, the term of this patent is extended or adjusted under 35 U.S.C. 154(b) by 1056 days.

(21) Appl. No.: 17/247,237

(22) Filed: Dec. 4, 2020

(65) Prior Publication Data

US 2022/0012155 A1    Jan. 13, 2022

(30) Foreign Application Priority Data

Jul. 10, 2020   (CN) .......................... 202010664768.4

(51) Int. Cl.
*G06N 20/00*    (2019.01)
*G06F 11/34*    (2006.01)
(Continued)

(52) U.S. Cl.
CPC ........ *G06F 11/3438* (2013.01); *G06F 21/602* (2013.01); *G06N 7/01* (2023.01); *G06N 20/00* (2019.01)

(58) Field of Classification Search
CPC ... G06F 11/3438; G06F 21/602; G06N 20/00; G06N 7/01
See application file for complete search history.

(56) References Cited

U.S. PATENT DOCUMENTS

| 2019/0164062 A1 | 5/2019 | Moura et al. |
| 2020/0202243 A1 | 6/2020 | Guttmann |
| 2021/0166157 A1* | 6/2021 | Bhowmick .............. G06N 3/04 |

FOREIGN PATENT DOCUMENTS

| CN | 107766889 | 3/2018 |
| CN | 110197128 | 9/2019 |

(Continued)

OTHER PUBLICATIONS

Chen et al., Dimensionality Reduction of Data for Human Activity Recognition, Oct. 2016. (Year: 2016).*

(Continued)

*Primary Examiner* — Marshall L Werner
(74) *Attorney, Agent, or Firm* — Michael Ye; Kalos Athena Wang PLLC

(57) ABSTRACT

The present invention relates to an activity recognition system balanced between versatility and individuation, comprising a communication framework jointly formed by a data collecting terminal, a computing device, and a cloud computing platform, the activity recognition system uses the communication framework to conduct personnel activity recognition and model updating, and the edge computing device further comprises a model training module and an activity recognition module, and the model training module retrieves a local activity recognition model by continuously verifying user IDs, and uses the first data to train a versatile network structure and an individualized network structure of the local activity recognition model in a way that individuation features of the user and versatility features of the model are fused with each other, so that the personnel activity recognition process conducted by the activity recognition module.

2 Claims, 3 Drawing Sheets

(51) Int. Cl.
    *G06F 21/60* (2013.01)
    *G06N 7/01* (2023.01)

(56) References Cited

FOREIGN PATENT DOCUMENTS

| CN | 110414373 | 11/2019 |
| CN | 110443063 | 11/2019 |
| CN | 110705684 | 1/2020 |
| CN | 111241580 | 6/2020 |

OTHER PUBLICATIONS

Arivazhagan et al., Federated Learning with Personalization Layers, Dec. 2019. (Year: 2019).*
Zhang et al., Staleness-Aware Async-SGD for Distributed Deep Learning, Apr. 2016. (Year: 2016).*
Ehatisham-ul-Haq et al., Authentication of Smartphone Users Based on Activity Recognition and Mobile Sensing, Sep. 2017. (Year: 2017).*
Chen et al., FedHealth: A Federated Transfer Learning Framework for Wearable Healthcare, Jul. 2019. (Year: 2019).*
Chinese Office Action mailed Dec. 22, 2021 in Chinese Application No. 2020106647680.4. No English translation.

* cited by examiner

ACTIVITY RECOGNITION MODEL BALANCED BETWEEN VERSATILITY AND INDIVIDUATION AND SYSTEM THEREOF

CROSS-REFERENCE TO RELATED APPLICATIONS

This application claims the benefit of the Chinese Patent Application No. CN202010664768.4 filed on Jul. 10, 2020, which is hereby incorporated by reference as if fully set forth herein.

BACKGROUND OF THE INVENTION

1. Technical Field

The present invention relates to the field of artificial intelligence technology, and more particularly to an activity recognition system balanced between versatility and individuation and a system thereof.

2. Description of Related Art

Activity recognition plays an important role in various scenarios like industrial production, health monitoring, security detection, and smart homes. For recognizing activities of a user, the existing solution requires the user to provide a large amount of labeled data to train and get a reliable activity recognition model. However, since different users have different posture features and behavioral habits, it is impractical to use an existing recognition model to recognize activities of a new user. Thus, a new user still needs to provide a large amount of data to adjust the recognition model parameters or re-train a suitable activity recognition model, significantly degrading user experience.

In order to minimize training costs for new users, one approach is about training general models to improve their generalization ability. For example, China Patent Publication No. CN109086704A discloses a human activity recognition method based on rarefaction representation and Softmax classification. It comprises S1: using a huge wireless sensor active signal data set to train a Softmax model; and Step S2: using the trained Softmax model to classify and recognize activity signals detected in a realtime manner. The known technical scheme trains the huge sensor activity signal data set in a database, and determines classes of signals, before using the rarefaction representation algorithm to process the activity signals, thereby significantly reducing computing workload and complicity for human activity signal recognition, while effectively improving accuracy of human activity analysis.

The existing method involves collecting a large amount of user data in a in the training phase, without asking a new user to subsequently provide huge training data. While such a general model does improve generalization ability, it discards user-specific features. For individual users, their exclusive features are contributive to their own activity recognition. Therefore general models are less accurate in terms of activity recognition of individuals than traditional recognition methods.

Another approach is about using a personalization model, which involves analyzing existing models and data, and migrating those parts beneficial to a new recognition object to a new task. For example, China Patent Publication No. CN106056043B disclosed an animal behavior identification method and apparatus based on transfer learning. The training sample in a training data set comprises one or more than one from the group composed of a human behavior sample, a non-object animal behavior sample and an object animal behavior sample, and a test data set is an object animal behavior sample. The method comprises: Step 101, extracting original characteristics for each training sample in the training data set and each test sample in the test data set; Step 102, employing a domain adaptation learning method in transfer learning to map the original characteristics onto a common space to obtain new characteristics; Step 103, utilizing the new characteristics to train a support vector machine classifier, obtaining a behavior identification model, and meanwhile testing an object animal behavior identification model; and Step 104, utilizing the animal behavior identification model to identify object animal behavior to be identified.

As another example, China Patent Publication No. CN111160462A discloses an unsupervised personalized human activity recognition method based on multi-sensor data alignment. The model gives weight to an intermediate representation layer using an attention network, thereby improving performance of both global recognizers and activity classifiers. Besides, it aligns distribution of multi-sensor data of a training user and a new user in a feature space by adopting an adversarial learning strategy, thereby enhancing generalization ability of the model and reducing training costs for new users.

In the known method, since the migrated part can be deemed as pre-trained, a new user has only to provide a small amount of data for optimized and calibrate parameters of the migration model. However, in the existing migration practice, a data-based migration method can consume considerable network resources, and is subject to the risk of privacy disclosure. In addition, model migration requires relatively more manual intervention to determine which part to be migrated, leading to increased migration costs.

In addition, since there is certainly discrepancy between the prior art comprehended by the applicant of this patent application and that known by the patent examiners and since there are many details and disclosures disclosed in literatures and patent documents that have been referred by the applicant during creation of the present invention not exhaustively recited here, it is to be noted that the present invention shall actually include technical features of all of these prior-art works, and the applicant reserves the right to supplement the application with the related art more existing technical features as support according to relevant regulations.

SUMMARY OF THE INVENTION

Many recognition systems have been extensively used in various applications, and they generally rely on a large amount of data provided by users to train or optimize a recognition model. Nevertheless, given the fact that differences of posture features and behavioral habits exist among users, it is impractical to apply an established recognition model directly to a recognition task for a new user. To solve this problem, there are two known main current strategies. The first is to collect as much user data as possible and to use common features extracted therefrom to train a general recognition model. This strategy does help to save some costs for training the model for new users, but as it discards personal features of individual users, accuracy in activity recognition tasks for individuals is compromised. The second approach is about migrating general features in the existing model to a recognition model for a new user, and fine-tunning the new model using a small amount data collected from the new user. This strategy can perform well for recognition of personal activities, but manual operation has to be made to determine which general features are to be migrated. Besides, the known strategy when used for general recognition tasks tends to see deviation due to personal features of different users. To address the shortcomings of the two popular strategies in the prior art, the present invention provides a novel activity recognition model and system, which are balanced between versatility and individuation, with the aim to improve generalization ability without compromising accuracy of activity recognition for individuals. When used in a recognition task for a new user, the model of the present invention eliminates the need for costly and high-deviation manual intervention.

To be more specific, the present invention provides an activity recognition system balanced between versatility and individuation, comprising a communication framework jointly formed by at least one data collecting terminal, at least one edge computing device, and a cloud computing platform, the activity recognition system uses the communication framework to conduct personnel activity recognition and model updating, wherein the edge computing device at least comprises: a data pre-processing module, for pre-processing sensing signals collected by the data collecting terminal so as to obtain first data, the activity recognition system being characterized in that the edge computing device further comprises a model training module and an activity recognition module, wherein: the model training module retrieves a local activity recognition model by continuously verifying user IDs, and uses the first data to train a versatile network structure and an individualized network structure of the local activity recognition model in a way that individuation features of the user and versatility features of the model are fused with each other, so that the personnel activity recognition process conducted by the activity recognition module based on the local activity recognition model obtained after training is balanced between versatility and individuation.

If we see cloud computing as centralized big data processing, edge computing can be understood as big data processing at edge. Cloud computing and edge computing are usually compared with each other. Cloud computing has many features, such as great computing capability, huge storage capacity, and high versatile for different applications with working with appropriate software tools. Many of our daily used APPs essentially rely on cloud computing technologies, such as live video streaming platforms, e-commerce platforms, etc. Edge computing stems from cloud computing, and is close to the equipment side. Although it is highly responsive, it is less capable of dealing with high-load computing and storage. The relationship between the two may be explained using the human nervous system. Cloud computing is able to process a large amount of information, and can store short- and long-term data, making it very similar to the human cerebrum, which is not only the largest and the most complex structure in the central nervous system, but the paramount organ for regulating body functions. The cerebrum is also the physical basis of higher nervous activities such as consciousness, spirit, language, learning, memory and intelligence. The gray matter layer in the human cerebrum contains billions of nerve cells, which form the groundwork of intelligence. But the cerebrum is not the only organ having the gray matter layer in human body. The spinal cord also has the gray matter layer, and has a simple central nervous system that processes reflex actions from the limbs and the trunk, and transmit nervous information between the brain and the periphery. As edge computing is to cloud computing, so is the spinal cord to the cerebrum. Edge computing is highly responsive and can work without the support form cloud computing.

Adoption of edge computing is advantageous for the following reasons. The first advantage is short latency. Since computing capability is deployed near the equipment side, computing tasks no more need responses form the cloud computing hub and responses at the equipment can be more realtime. The second advantage is its low-bandwidth operation. With edge computing, temporary data can be kept locally at edge without going up to the cloud server. This makes tasks closer to users or free data collecting terminals from bandwidth limitations at local sites. Particularly, the number of requests for data processing from edge nodes to the hub can be significantly reduced. The third advantage is privacy protection. Since privacy data is collected locally, analyzed locally, and processed locally without being uploaded, exposure of data to a public network is minimized, thereby better protecting data privacy.

The present invention uses a "cloud edge" hardware architecture to make use of the advantages of cloud edge in IoT applications, such as short latency and low bandwidth. There are some prior-art solutions using a cloud edge hardware architecture. For example, in a master's thesis of Beijing University of Technology titled "Design and Implementation of Data Acquisition and Processing Systems Based on Edge Computing," Chapter II discloses a data acquisition and processing system based on edge computing. FIG. 4 provides a hardware block diagram, a schematic diagram of a physical Data Collection module, a schematic drawing showing data pre-processing and a semi-cycle flowchart of the edge-computing data acquisition and processing system as disclosed in this paper. In the known system, model testing is exclusive to edge devices, and data analysis is only conducted in the cloud. The edge devices are only allowed to train their local recognition models using small-scale sample data. Although this design considers personal features from a small sample size, these personal features nevertheless have adverse effects on generalization ability of the model. Different form the existing edge-computing system as described previously, the disclosed system endows both edge devices and the cloud computing platform with data analysis capability. An edge device uploads a general recognizer of a local recognition model to the cloud equipment for updating. The cloud equipment mitigates the adverse effects caused by deviation/personal features from the small sample size by fusing multiple local recognition models, so as to make the system have both personalization and generalization, thereby significantly improving generalization ability of the system.

According to one preferred embodiment, the model training module uploads a second data it obtain through calculation based on the local activity recognition model before training and the local activity recognition model after training to the cloud computing platform, the cloud computing platform maintains at least one versatile model therein and when the second data uploaded by each said model training module satisfy a predetermined model updating condition, the parameters of the versatile model are adjusted.

The disclosed activity recognition system is the first to use federated learning to update recognition models in the cloud and in edge equipment. The updating can be easily done by exchange of encrypted model parameters between the cloud and an edge device, so the risk of user privacy disclosure can be significantly reduced. Herein, the term "federated learning" is also known as federated machine learning or collaborative learning. Federated learning may be realized in a machine learning framework, which can effectively help multiple institutions to perform data use and machine learning modeling while satisfying user privacy protection, data security and regulatory requirements. With federated learning working as a paradigm of distributed machine learning, the problem of isolated data islands can be effectively solved, and participating parties are allowed to conduct collaborative modeling without sharing data with each other. In brief, isolated data islands are technically eliminated and AI collaboration is achieved. Federated learning makes the system more generalized across data structures and institutions. The resulting system is free form limitations in terms of domain and algorithm, and enjoys the advantages of good model quality, privacy protection and data security.

According to one preferred embodiment, the model training module continuously verifies the user IDs so as to obtain new user information or registered user information, when the ID of the current user is the new user information, the versatile model of the cloud computing platform is retrieved and used as the local activity recognition model, or when the ID of the current user is the registered user information, the local activity recognition model in the activity recognition module that corresponds to the current user and has received at least one session of training for activity recognition is retrieved.

According to one preferred embodiment, when the ID of the current user is the new user information, the model training module trains the local activity recognition model it retrieves from the cloud computing platform by retaining a fusing result of the versatile network structure and initializing parameters of the individualized network structure.

According to one preferred embodiment, the predetermined model updating condition in the cloud computing platform refers to that when a proportion of said local activity recognition models that have finished the model updating excesses a given threshold, the model updating for the versatile model in the cloud computing platform begins.

According to one preferred embodiment, updating of the general model is achieved by that: each said edge computing device uses local data calculating model to update a gradient, uses an encryption technique to encrypt the gradient, and send the encrypted gradient to the cloud computing platform; and/or the cloud computing platform, without knowledge of any edge computing device information, performs secure aggregation, when the model updating condition for the general model is satisfied, on the encrypted gradient it receives, so as to obtain an aggregated gradient; and/or the cloud computing platform adjusts the general model according to the aggregated gradient, thereby achieving updating of the general model, and sends the aggregated gradient to the edge computing device; and/or the edge computing device fine-tunes the local activity recognition model according to the aggregated gradient.

According to one preferred embodiment, the data pre-processing module uses pre-processing techniques including at least one or more of calibration, noise reduction and interpolation to process a received sensation signal, and according to characteristics of a data source conducts signal sharding, dimensionality compression, and characteristic extraction.

According to one preferred embodiment, the local activity recognition model primarily comprises a user identifier and an activity recognizer, the activity recognizer corresponds to the versatile network structure part of the activity recognition model and uses a structured eigenvector as an input to output an activity type, while the user identifier corresponds to the individualized network structure part of the activity recognition model and uses a higher hidden layer in the activity recognizer as an input.

Some solutions have been proposed to address the problem of high costs for data labeling caused by user diversity. For example, China Patent Publication No. CN111160462A discloses an unsupervised personalized human activity recognition method based on multi-sensor data alignment. The model gives weight to an intermediate representation layer using an attention network, thereby improving performance of both global recognizers and activity classifiers. Besides, it aligns distribution of multi-sensor data of a training user and a new user in a feature space by adopting a counterstudy strategy, thereby enhancing generalization ability of the model. Different from the existing activity recognition system as describe previously, the present invention provides a model that is suitable for a "cloud edge" hardware architecture and suitable for multimodal activity recognition tasks. The present invention therefore additionally incorporates a user identifier, and uses the loss function to control it to represent personal features of users. The personal features contained in the user identifier are used to identify users and participate in activity recognition to improve results of personal activity recognition. When migration to a new edge device is made, the only adaption required is to fine-tune parameters of the user identifier according to a small amount data from the relevant new user, thereby reducing costs related to training of edge local models. The disclosed activity recognition system of the present application is less strict in how data is collected, and is applicable to multimodal activity recognition tasks. The usable signal sources include wearable accelerometers, gyroscopes, magnetometers, and heart rate monitors as mentioned in the aforementioned patent document, and wireless signals that can be reflected by human body, such as sound waves, electromagnetic waves, visible light and so on.

The present invention further puts forward an activity recognition method balanced between versatility and individuation, being characterized in at least comprising one or more steps of: using pre-processing techniques including at least one or more of calibration, noise reduction and interpolation to process a received sensing signal, and according to characteristics of a data source conducting signal sharding, dimensionality compression, and characteristic extraction, so as to obtain a structured data; using the structured data as an input of a recognition model, using an activity recognition model to recognize a personnel activity, and continuously verifying user IDs; where it is determined that a current user has not been registered, downloading a pre-trained model from a cloud computing platform to a current edge computing device; where it is determined that the current user is a new user, training the user identifier and fine-tuning the activity recognizer according to on a small amount of training data provided by the user; where it is determined that the current user is a registered user, the pre-trained model collecting data of the user at a back end for on-line learning, and generating local model updating parameters; uploading the local model updating parameters to the cloud computing platform; and when an updating condition for a general model is satisfied, the cloud computing platform integrating the model updating parameters it receives from all the edge computing devices for updating the versatile model.

The present invention further puts forward an activity recognition model balanced between versatility and individuation, at least comprising a user identifier and an activity recognizer, the activity recognizer corresponds to a versatile network structure part of the activity recognition model and uses a structured eigenvector as an input to output an activity type, the user identifier corresponds to an individualized network structure part of the activity recognition model and uses a higher hidden layer in the activity recognizer as an input, so that the activity recognition model is able to separate individuation features of a user and recognize a personnel activity of the user by fusing the individuation features and versatility features of the model.

DETAILED DESCRIPTION OF THE INVENTION

Figure 1:
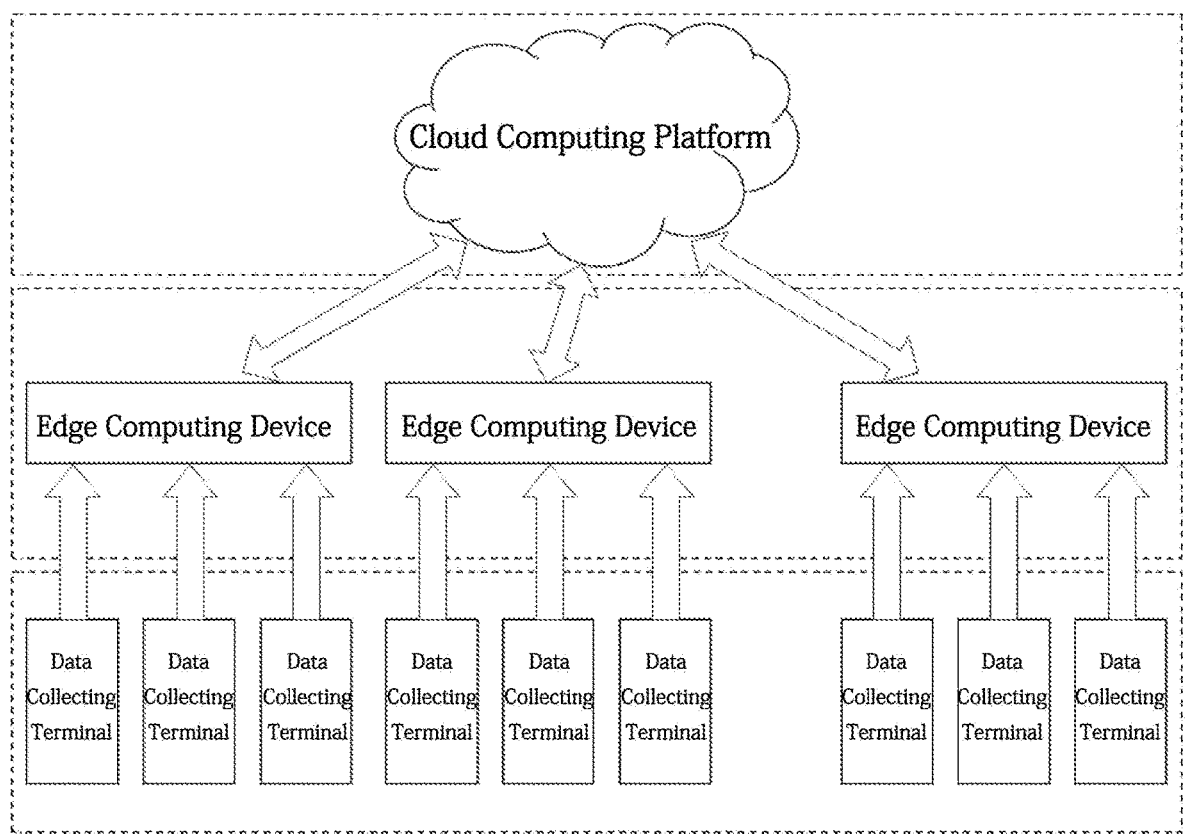
FIG. 1 is a simplified module connection diagram of an activity recognition system of the present invention.

The following description of the present invention is made with reference to the accompanying drawings.

The objective of the present invention is to address the problem of high training costs as required by traditional methods by providing a personalized activity recognition model and a system thereof. The present invention ensures generalization ability of models using distributed system updating. Before detailed description of the technical schemes of the present invention, terms and abbreviations used herein for describing the disclosed activity recognition model and system are clarified first as below:

| Terms and Abbreviations | Expatiation |
| --- | --- |
| Activity Recognition | Activity recognition (also known as Human Activity Recognition, or HAR) an extensive research field related to recognition of specific human movements or motions based on data from sensors. In the art of artificial intelligence, a typical process for activity recognition is: first acquiring movement data from sensors arranged across a human body using a Data Collection system, wherein locations of the sensors are in close connection with particular activities; processing the data from the sensors using procedures such as noise reduction and smoothing; then segmenting the data and extracting features therefrom, wherein the most common segmenting procedure is sliding window, and the selection of the features is made for dimensionality reduction, which is achieved by selecting those features that have higher correlation with the particular movements so as to minimize subsequent computation loads and enhance classification accuracy; and at last, recognizing the current human activity using a classifier that has been trained using feature samples. |
| Edge Computing | As defined by the OpenStack (a free software and open source code project collaboratively developed and initiated by NASA and Rackspace and licensed by Apache) community, edge computing refers to the practice that application developers and service providers provide cloud services and IT environment services at the edge of a network. Its objective is to provide services like computing, storage and network bandwidth at places closer to data inputs or its users. A more general term that can represent |

-continued

| Terms and Abbreviations | Expatiation |
| --- | --- |
| | edge computing may be "Proximity Computing". |
| Generalization Ability | Generalization ability may refer to the ability of an algorithm model to predict unknown data, or may refer to the ability of a machine learning algorithm to adapt itself to new samples. Briefly, having the ability means when new data set are added to existing data sets, an algorithm can output reasonable results after trained. The objective of learning is to acquire a pattern behind data, so that a trained network when receiving data outside the learning set but having the same pattern can give out proper outputs. This is what generalization ability is about. It is usually expected that a network trained using samples has better generalization ability, meaning that it is more capable of giving out reasonable responses to new inputs. |
| Loss Function | The loss function measures inconsistency between a value f(x) predicted by a model and an actual label value y from samples. Assuming that an input sample data is x, the model function outputs f(x), the f(x) of the output and actual label value y from samples may be the same or different. To indicate how satisfying fitting is, a function is used to measure the level of fitting. The loss function is a real-valued function, and the smaller is the value, the better the model fits a training sample set. |
| Overfitting | Overfitting occurs when a hypothesis is made excessively rigid in order to get consistency. How to avoid overfitting is a critical challenge for design of classifiers. Classifiers are evaluated for performance by means of increasing sizes of data and sample sets. Overfitting is caused by training data having sampling errors that are also involved during fitting of parameters of a complex model. A sampling error refers to deviation between a sample set obtained through sampling and the overall data set. |
| Robustness | Robustness is a measure for evaluating the ability of a computer system to maintain normal operation in the event of processing errors or abnormal input or computing. An algorithm model having good robustness means its overall performance is basically independent of abnormal data. Robustness is different from stability, which refers to the ability to have properties not change over time, while robustness is usually used to describe the capability of facing complex adaptive systems. |
| WLAN | WLAN is the abbreviation of Wireless Local Area Network. It may refer to a network of computer equipment formed using wireless communication technologies to allow members of the network to intercommunicate and share resources. The essential feature of a WLAN is connecting a computer to the network in a wireless manner instead of using physical cables, thereby making building of a network and mobility of a terminal more flexible. |
| Physical Layer Signal | A physical layer (PHY) is the bottom layer in an open system interconnection reference model. The physical layer protocol provides mechanical, electronic, functional and regulatory properties required by building, maintenance, and dismantling of a physical link for data transmission. A physical layer works as a transmission medium media and an interconnection means for reliable data communication between devices. A physical layer mainly serves to provide data end equipment with data transmission paths. |
| CSI | CSI is the abbreviation of Channel State Information. It may refer to information that can be used to evaluate channel properties of a communication link. CSI may refer to information of a physical layer in a subcarrier level. This information describes how a signal is propagated |

-continued

| Terms and Abbreviations | Expatiation |
|---|---|
| | from a transmitting end through the air to a receiving end, and reflects fading factors of a signal in every propagation path, such as signal scattering, environmental fading, and power attenuation over distance and so on. CSI-based wireless sensation makes use of the characteristics of wireless multipath propagation, and works by deducing variations in the surrounds through analysis of changing states of its multiple subcarriers. It allows movements and behavior of a user to be determined in a non-line-of-sight environment without the need of having the user carry a sensor with him/her. |
| Hidden Layer | All layers other than the input layer and the output layer are hidden layers. A hidden layer does not directly receive signals from the exterior, and does not directly send signals to the exterior. |

For further illustrating the means and functions by which the present invention achieves the certain objectives, the following description, in conjunction with the accompanying drawings and preferred embodiments, is set forth as below to illustrate the implement, structure, features and effects of the subject matter of the present invention. In addition, the technical features described in the following embodiments of the present invention may be used in combination as long as no conflict is caused by doing so.

The disclosed activity recognition system of the present invention can reduce training costs and migration costs while ensuring relatively high accuracy of activity recognition for individuals. As shown in FIG. 1, the system is primarily composed of three parts, namely a data collecting terminal, an edge computing device, and a cloud computing platform.

The data collecting terminal is now described. The data collecting terminal mainly serves to collect and upload data. The sensation model of the present invention is applicable to any sensation signals. Thus, the collecting terminal is not limited to a portable or wearable device. Instead, it may be a different device or a sensor that are sensitive to human behavior in an environment, such as a monitoring camera or a wireless router. To minimize energy consumption, the data collecting terminal can be designed to have merely simple capability for collecting data and transmitting data to the edge computing device.

The description is now directed to the edge computing device. The edge computing device mainly serves to perform signal processing, to train the local activity recognition models and to conduct activity recognition. The edge computing device first uses procedures like calibration, noise reduction and interpolation to process the sensation signals it receives. Then it conducts sharding, dimensionality compression, and characteristic extraction on the signals according to characteristics of data sources. At last, the processed data is used to train the personalized recognition models, or used to recognize activities of personnel.

Figure 3:
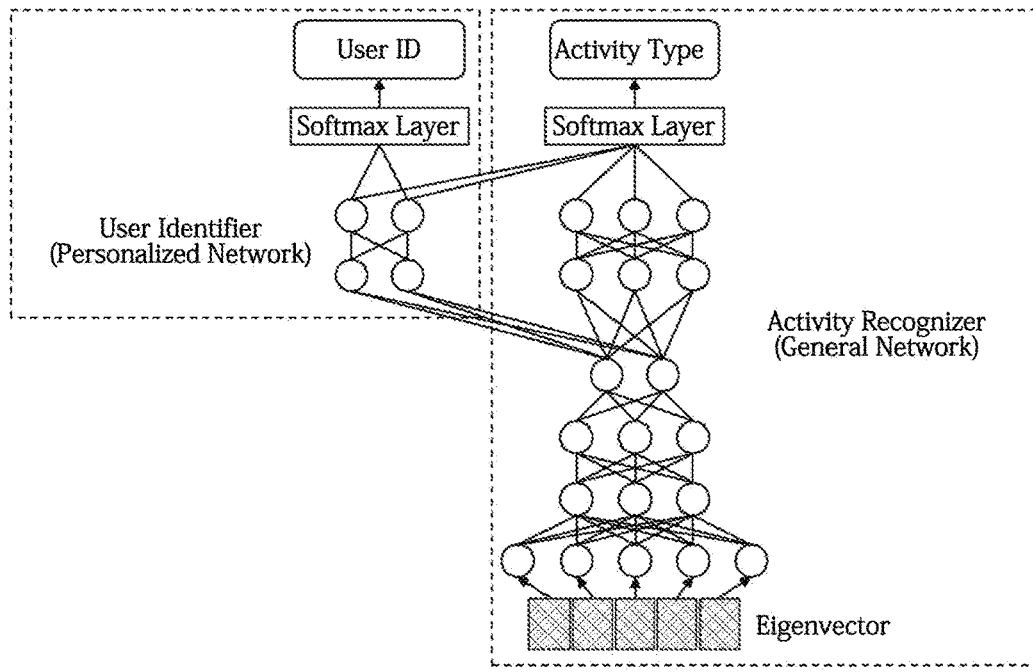
FIG. 3 is a simplified structural diagram of an activity recognition model of the present invention.
Figure 4:
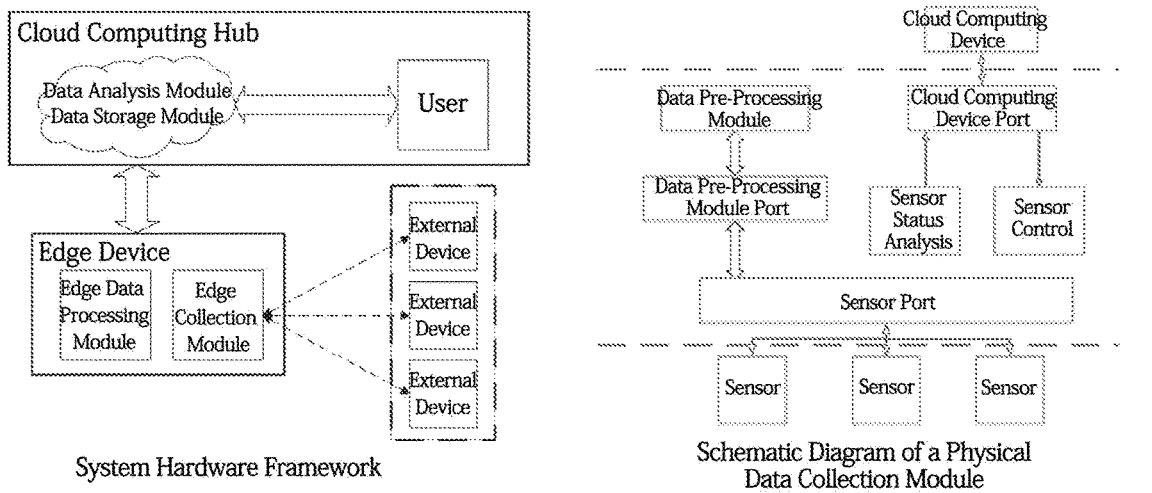
FIG. 4 shows a simplified hardware block diagram and a flowchart of a prior-art system.
Figure 4:
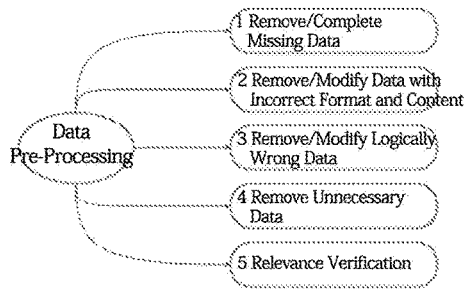
Figure 4:
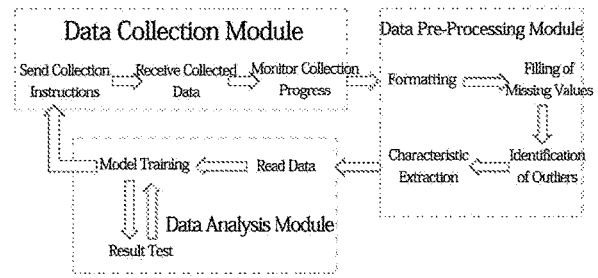

The personalized recognition model is further described below. As shown in FIG. 3, the disclosed personalized activity recognition model of the present invention primarily comprises two parts, namely a user identifier and an activity recognizer. The activity recognizer belongs to the general network of the model, and may be build using any deep neural network that is architecturally suitable for activity recognition tasks. The activity recognizer uses a structured eigenvector as its input, and outputs an activity type. The user identifier belongs to the personalization network of the model. As compared to the activity recognizer, the user identifier has fewer layers, and it uses a higher hidden layer in the activity recognizer as its input. All the layers in the deep neural network other than the input layer and the output layer are hidden layers. In view that personal features are contributive to activity recognition of individuals, for ensuring good accuracy of personal activity recognition of the activity recognizer, the personal features in the user identifier also participate in activity recognition tasks. Such a design can advantageously separate personal features of users and make these personal features participate in activity recognition. In this way, the present invention can not only accomplish user activity recognition, but also ensure high accuracy of personalization recognition, while having the resulting general network architecture exhibiting excellent generalization.

The design of the loss function L in the training phase is now described. Assuming that there are n types of activities and m users, and that the output of the activity recognizer is an n-dimensional vector, $a=\{a_1, a_2, a_3, \ldots, a_n\}$, and the range of each element is [0,1], representing the possibility of each activity. $L_a$ is the loss function of the activity recognizer, and may be represented as: $L_o=g(aa^T)$ The function g is a commonly used loss function (such as mean-square error and cross entropy). Similarly, the loss function for the user identifier is $L_u$. The total loss function L may be represented as:

$$L=\alpha L_a+(1-\alpha)L_u+L_o$$

where α is an artificially set weight, and $L_c$ is the constraint condition, whose purpose is to prevent the personalized activity recognition model form overfitting.

The cloud computing platform is now detailed. The cloud computing platform is used to store and update the general activity recognition model. The cloud computing platform maintains therein a pre-trained model for general use. The model conducts parameter adjustment according to local model updating parameters uploaded by the each edge computing devices. The pre-trained general model retains the fused result of the activity recognizer architecture of the local activity recognition model, and initializes parameters of the personalization network architecture. When a new user registers, a pre-trained general model is downloaded from the cloud. Afterward, only a small amount of data from the user is enough for the pre-trained general model to learn the parameters of the user identifier.

Figure 2:
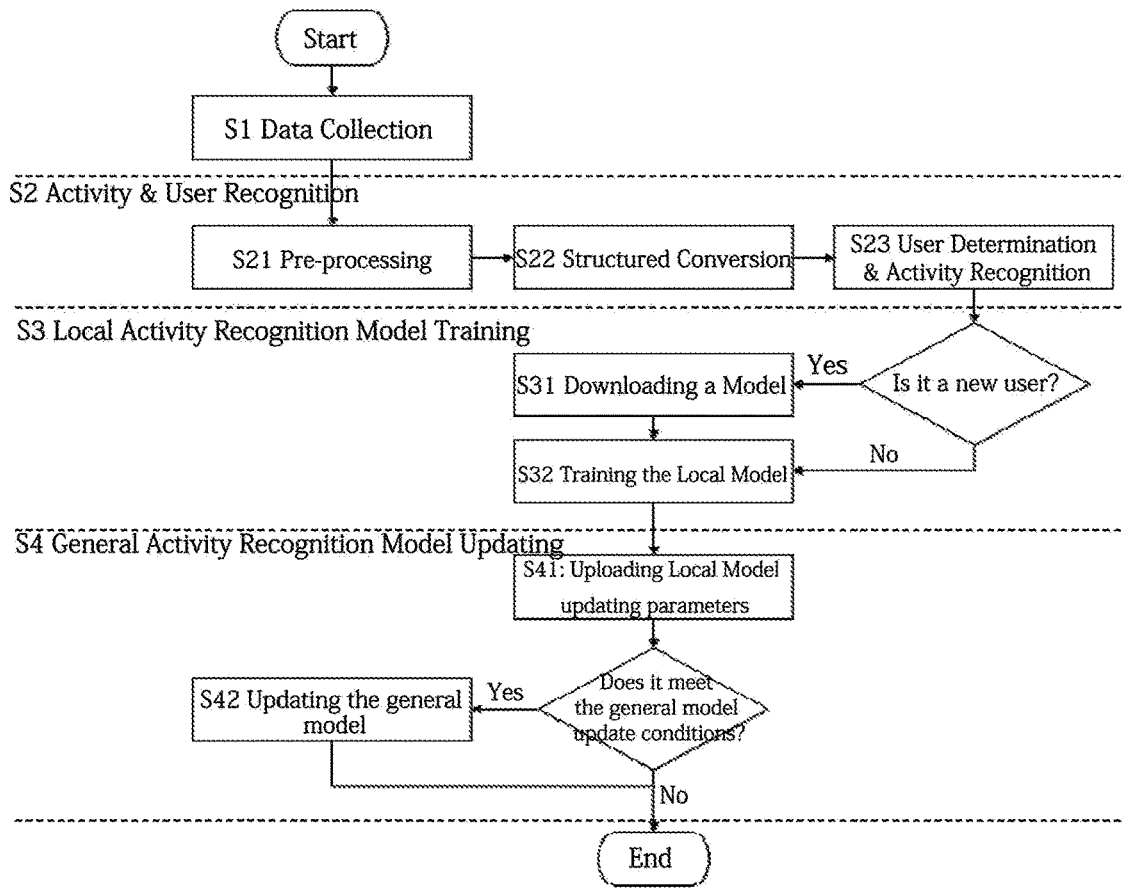
FIG. 2 is a simplified flowchart of activity recognition process conducted by the activity recognition system of the present invention.

For easy understanding, the present invention is further explained with reference to CSI (channel state information) of a WLAN as an example. As shown in FIG. 2, the disclosed activity recognition system is composed of four parts, namely Data Collection (S1), User Determination & Activity Recognition (S2), Local Activity Recognition Model Training (S3) and General Model Updating (S4).

S1: Data Collection.

The data collecting terminal collects data relates to personnel activities, and sends the data to an edge computing device.

S2: User Determination & Activity Recognition.

The edge computing device conducts activity recognition and continuously verify the user. It comprises three steps: pre-processing, structured conversion and User Determination & Activity Recognition.

S21: Pre-Processing.

Due to the influence from equipment and environment, the received signals contain a large amount of noise, which significantly decreases accuracy of recognition. To address this, the present invention uses procedures like filtering, interpolation, and smoothing to reduce noise in the signals.

S22: Structured Conversion.

In order to meet the requirements for structured input data of the recognition models, non-structured stream data has to be converted into structured data shards. The present invention may use, for example, window-type sharding method. First, short-time Fourier transform is used to convert the received time-domain signals into time-frequency signals, and a sliding window with a constant size is used to segment the time-frequency signals into continuous data frame segments to be used as the input of the recognition model.

As used in the present invention, short-time Fourier transform is a common time-frequency analysis method. It uses a segment of signal within the time window to represent signal features at a certain moment. During short-time Fourier transform, the length of the window determines the time resolution and frequency resolution of the spectrum. Particularly, a longer window means a longer captured signal segment, and higher frequency resolution as well as lower time resolution after Fourier transform. On the contrary, a shorter window means a shorter captured signal segment, and lower frequency resolution as well as higher time resolution.

S23: User Determination & Activity Recognition.

The edge computing device uses the activity recognition model to recognize personnel activities, and continuously verify an ID of the user.

S3: Local Activity Recognition Model Training.

Since the posture features and behavioral habits of a user can be changing, the model parameters have to be adjusted continuously. The phase of S3 involves two situations, namely model training for a new user, and continuous on-line learning.

S31: Download Model.

When it is determined in Step S23 that the current user is not in the system, a pre-trained model is downloaded from the cloud to the current edge computing device.

S32: Training Local Model.

Training of local models has two possibilities. When it is determined that the user is new to the system, the system asks the user to provide a small amount of training data to train the user identifier and to fine tune the activity recognizer. In the other case, when the user is a registered user, the model collects data of the user at the back end and uses the data for on-line learning and for generation of local model updating parameters.

S4: General Model Updating.

S41: Uploading Local Model Updating Parameters.

The edge computing device uses the local data to update the local model, and then uploads the updating parameters of the local model to the cloud computing platform.

S42: Updating the General Model.

The cloud computing platform receives the local model updating parameters uploaded by the edge computing device. When the updating condition for the general model is satisfied, the cloud computing platform integrates the model updating parameters it receives from all the edge computing devices for updating the general model.

Preferably, the condition for updating the general model is to be properly set. The local models at the edge devices may have different updating frequencies, and the model parameters may include preference features of the user. Without limiting updating of the cloud model, the general model may have deviation due to some active (updated more frequently) local models. Therefore, in order to prevent this deviation, it is necessary to introduce a suitable general model updating condition. That is, when a proportion of the local models that have updated excesses a given threshold, the model updating for the general model in the cloud begins.

Preferably, the updating algorithm for the general model involves the following steps:

Step 1: making each edge computing device use its local data to calculate a model updating gradient, encrypting the gradient using an encryption technique, and then sending the encrypted gradient to the cloud computing platform;

Step 2: making the cloud computing platform that has no knowledge of the edge computing device information perform secure aggregation, when the model updating condition for the general model is satisfied, on the encrypted gradient it receives, so as to obtain an aggregated gradient;

Step 3: making the cloud computing platform adjust the general model according to the aggregated gradient, thereby achieving updating of the general model, and send the aggregated gradient to the edge computing device; and Step 4: making the edge computing device fine-tune the local activity recognition model according to the aggregated gradient.

The edge computing device mainly uses local data to update the model, and fine tuning of the local model according to the aggregated gradient helps to prevent local models from overfitting, thereby enhancing robustness of the local models.

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. An activity recognition system, comprising a communication framework jointly formed by at least one data collecting terminal, each of the at least one edge computing devices, and a cloud computing platform, the activity recognition system uses the communication framework to conduct personnel activity recognition and model updating, wherein at least one edge computing device at least comprises:

a data pre-processing module, for pre-processing sensing signals collected by the at least one data collecting terminal so as to obtain first data, wherein the data pre-processing module uses pre-processing techniques including at least one or more of calibration, noise reduction and interpolation to process a received sensing signal, and wherein the received sensing signal comprises human movement data collected by the at least one data collecting terminal, wherein the at least one data collecting terminal acquires human movement data from sensors arranged across a human body, and wherein locations of the sensors are at positions connected with movement of the human body;

the activity recognition system being characterized in that each of the at least one edge computing devices further comprises a model training module and an activity recognition module, wherein:

the model training module retrieves a local activity recognition model by continuously verifying user IDs, and uses the first data to train a versatile network structure and an individualized network structure of the local activity recognition model in a way that individuation features of the user and versatility features of the local activity recognition model are fused with each other, so that the personnel activity recognition conducted by the activity recognition module based on the local activity recognition model obtained after training is balanced between versatility and individuation, and wherein the local activity recognition model primarily comprises a user identifier and an activity recognizer, the activity recognizer corresponds to the versatile network structure part of the activity recognition model and uses a structured eigenvector as an input to output an activity type, while the user identifier corresponds to the individualized network structure part of the activity recognition model and uses a higher hidden layer in the activity recognizer as an input, wherein model parameters are adjusted continuously with changes in posture features and behavioral habits of a user of the activity recognition system, and wherein the user identifier uses a loss function to control it to represent personal features of users, and wherein each model training module uploads second data it obtains through calculation based on the local activity recognition model before training and the local activity recognition model after training to the cloud computing platform, the cloud computing platform maintains at least one versatile model therein and when the second data uploaded by each said model training module satisfy a predetermined model updating condition, parameters of the at least one versatile model are adjusted, and wherein each model training module continuously verifies the user IDs so as to obtain new user information or registered user information, when the ID of the current user is the new user information, the at least one versatile model of the cloud computing platform is retrieved and used as the local activity recognition model, or when the ID of the current user is the registered user information, the local activity recognition model in the activity recognition module that corresponds to the current user and has received at least one session of training for activity recognition is retrieved, and wherein when the ID of the current user is the new user information, the model training module trains the local activity recognition model it retrieves from the cloud computing platform by retaining a fusing result of the versatile network structure and initializing parameters of the individualized network structure, and wherein the predetermined model updating condition in the cloud computing platform refers to that when a proportion of said local activity recognition models that have finished the model updating exceeds a given threshold, the model updating for the at least one versatile model in the cloud computing platform begins, and wherein updating of the at least one versatile model is achieved by:

each of said at least one edge computing devices uses a local data calculating model to update a gradient, uses an encryption technique to encrypt the gradient, and sends the encrypted gradient to the cloud computing platform; and/or the cloud computing platform, without knowledge of any edge computing device information, performs secure aggregation, when the model updating condition for the at least one versatile model is satisfied, on the encrypted gradients it receives, so as to obtain an aggregated gradient; and/or the cloud computing platform adjusts the at least one versatile model according to the aggregated gradient, thereby achieving updating of the at least one versatile model, and sends the aggregated gradient to each of the at least one edge computing devices; and/or each of the at least one edge computing devices fine-tunes the respective local activity recognition model according to the aggregated gradient.

2. The activity recognition system of claim 1, wherein the data pre-processing module, according to characteristics of a data source, conducts signal sharding, dimensionality compression, and characteristic extraction.

* * * * *